United States Patent [19]
Reeves et al.

[11] Patent Number: 6,027,753
[45] Date of Patent: Feb. 22, 2000

[54] WAFER PRODUCT AND PROCESS OF MANUFACTURE

[75] Inventors: Joanna Catherine Reeves, Saint Dizier, France; Vito Antonio Tricarico, Jr., Naples, Italy

[73] Assignee: Good Humor Breyers Ice Cream, Green Bay, Wis.

[21] Appl. No.: 09/026,220

[22] Filed: Feb. 19, 1998

[30] Foreign Application Priority Data

Feb. 27, 1997 [EP] European Pat. Off. ............. 97200556

[51] Int. Cl.⁷ ...................................................... A21D 8/02
[52] U.S. Cl. ........................... 426/144; 426/94; 426/391; 426/549
[58] Field of Search ..................... 426/144, 549, 426/138, 94, 391

[56] References Cited

U.S. PATENT DOCUMENTS

| | | | |
|---|---|---|---|
| 3,696,734 | 10/1972 | Beasley et al. | 99/331 |
| 3,779,772 | 12/1973 | Forkner | 99/86 |
| 4,153,733 | 5/1979 | Pierce | 426/72 |
| 4,927,656 | 5/1990 | Ito | 426/549 |
| 4,937,084 | 6/1990 | Julian et al. | 426/144 |

FOREIGN PATENT DOCUMENTS

| | | |
|---|---|---|
| 393361 | 10/1990 | European Pat. Off. . |
| 561 513 | 9/1993 | European Pat. Off. . |
| 582922 | 2/1994 | European Pat. Off. . |
| 94/23583 | 10/1994 | WIPO . |

OTHER PUBLICATIONS

International Search Report in the application of PCT/EP 97/04572 dated Dec. 29, 1997.

*Primary Examiner*—David Lacey
*Assistant Examiner*—Hao Mai
*Attorney, Agent, or Firm*—James J. Farrell

[57] ABSTRACT

A crisp, approximately circular wafer product is provided whereby the two surfaces of the wafer each have a pattern formed by ridges, the first surface having a pattern comprising at least two grid patterns superimposed on each other, one grid being at an angle of approximately 45° to the other, the second surface having a single grid pattern, the pattern being at 45° to the lower grid on the first surface.

6 Claims, 4 Drawing Sheets

Fig.3.
Fig.4.

WAFER PRODUCT AND PROCESS OF MANUFACTURE

TECHNICAL FIELD OF THE INVENTION

The invention relates to a circular wafer product and a process for its manufacture.

BACKGROUND TO THE INVENTION

Circular wafer products are well known in the art. However to date in order to achieve the required circular shape the wafer batter is introduced into a hot mould. Such use of a mould results in a crude, soggy wafer because the mould provides no outlet for the moisture during cooking.

Wafer products manufactured by the introduction of a wafer batter between heated flat plates are crisp, but because of preferential flow of the batter, it has not been possible to date to provide an approximately circular product.

The present invention therefore addresses the problem of how to provide an approximately circular wafer which also has the desired crispness.

Surprisingly this problem can be solved if a specific pattern is formed by ridges on both sides of the wafer.

DESCRIPTION OF THE INVENTION

Accordingly the invention provides a crisp, approximately circular wafer product whereby the two surfaces of the wafer each have a pattern formed by ridges, the first surface having a pattern comprising at least two grid patterns superimposed on each other, one grid being at an angle of approximately 45° to the other, the second surface having a single grid pattern, the pattern being at 45° to the lower grid on the first surface.

Preferably each grid is formed by a pattern of squares.

The upper surface has preferably two superimposed grid patterns, the first (upper) grid being at a 45° orientation to the second (lower) grid.

Preferably the squares forming the pattern of the first grid on the first surface are larger compared to the squares forming the second grid of the first surface.

Preferably the squares forming the grid pattern on the second surface are smaller compared with the squares forming first grid pattern on the first surface. Most preferably the squares forming the grid pattern on the second surface are smaller compared with the squares forming either of the two superimposed grid patterns on the first surface.

The grid of the second surface preferably has the same orientation as the first grid of the first surface.

The wafers of the invention will generally be used as a component in a food product. Typically the wafer will be shaped and then filled with a food component, for example ice cream. Suggested products which may be produced are filled cones and Taco products.

Preferably when a filled product is prepared, the first surface of the wafer will form the outer surface of the filled product and the second surface will form the inner surface of the filled product.

The wafers are prepared by placing a wafer batter formulation between two heated plates having the required pattern engraved on the plates. The plates will typically be at a temperature of from 185 to 215° C.

Preferably the wafer is oiled whist still hot (for example at a temperature of greater than or equal to 100° C.).

If a shaped rather than a flat wafer is required, the wafer may either be formed into the required shape whilst still hot, or alternatively the wafer can be re-heated in order to be shaped. The re-heating can be by any suitable means, however the preferred means of re-heating is by infra-red radiation as disclosed in our co-pending European application number 96306392.0

For preparation of the wafer product of the invention the a wide number of wafer formulations can be used. It is believed to be well within the ability of the skilled person to determine which wafer compositions can suitably be used. Generally the wafers will be starch based e.g. made of wheat, rice, corn or other suitable flour. Other ingredients such as sugar, flavouring, emulsifier, milk ingredients, fat etc can be added. Preferably the wafer formulation comprises molasses.

Preferably wafers are prepared having a thickness of less than 3 mm, for example from 0.5 to 2.5 mm.

DRAWINGS

The invention will now be further illustrated by the following drawings;

FIG. 3 shows an end view of a wafer having a first surface pattern as shown in FIG. 1 and a second surface pattern as shown in FIG. 2.

FIG. 4 shows a cross section through 4—4 of FIG. 1 where the wafer has a first surface pattern as shown in FIG. 1 and a second surface pattern as shown in FIG. 2.

Comparative Figure A shows a comparative surface pattern which does not provide a circular wafer product.

Comparative Figure B shows a second comparative surface pattern which does not provide a circular wafer product.

EXAMPLES

The invention will now be further illustrated by the following examples.

Example 1

A wafer batter having the following formulation was prepared;

| Ingredient | wt % |
| --- | --- |
| Flour | 38.82 |
| Sucrose | 18.63 |
| Molasses | 3.88 |
| Invert Sugar | 1.79 |
| Oil & Lecithin | 1.00 |
| Salt | 0.93 |
| Water | to 100 |

The batter was introduced between heated flat plates having a temperature of approximately 200° C. and heated for 70 secs to provide a wafer. The flat plates had been engraved with a pattern such that one surface of the wafer was provided with the pattern shown in FIG. 1 and the other surface was provided with the pattern shown in FIG. 2, the pattern in FIG. 2 being at 45° to the smaller square grid of the pattern shown in FIG. 1.

Figure 1:
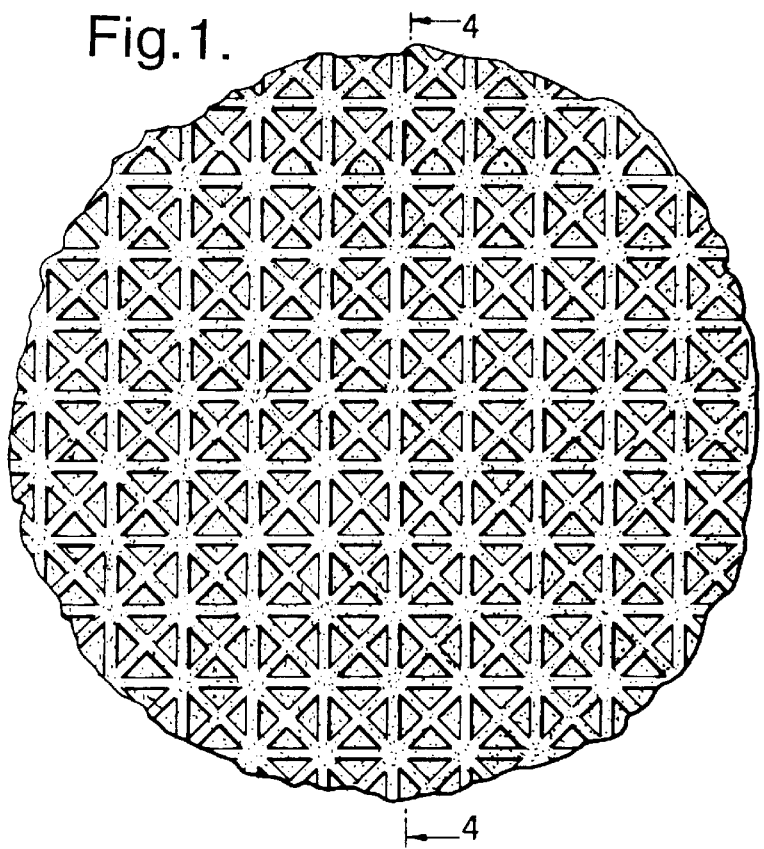
FIG. 1 shows a first surface wafer pattern according to the invention.
Figure 2:
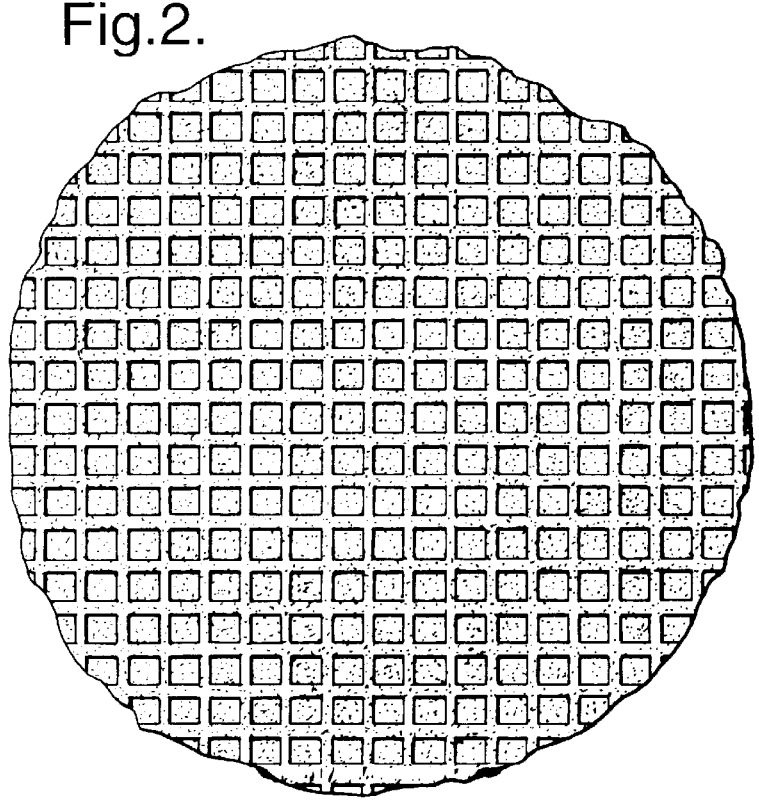
FIG. 2 shows a second surface wafer pattern according to the invention.

An approximately circular, crisp wafer was provided, as shown by FIGS. 1 and 2.

Example 2

Figure 5:
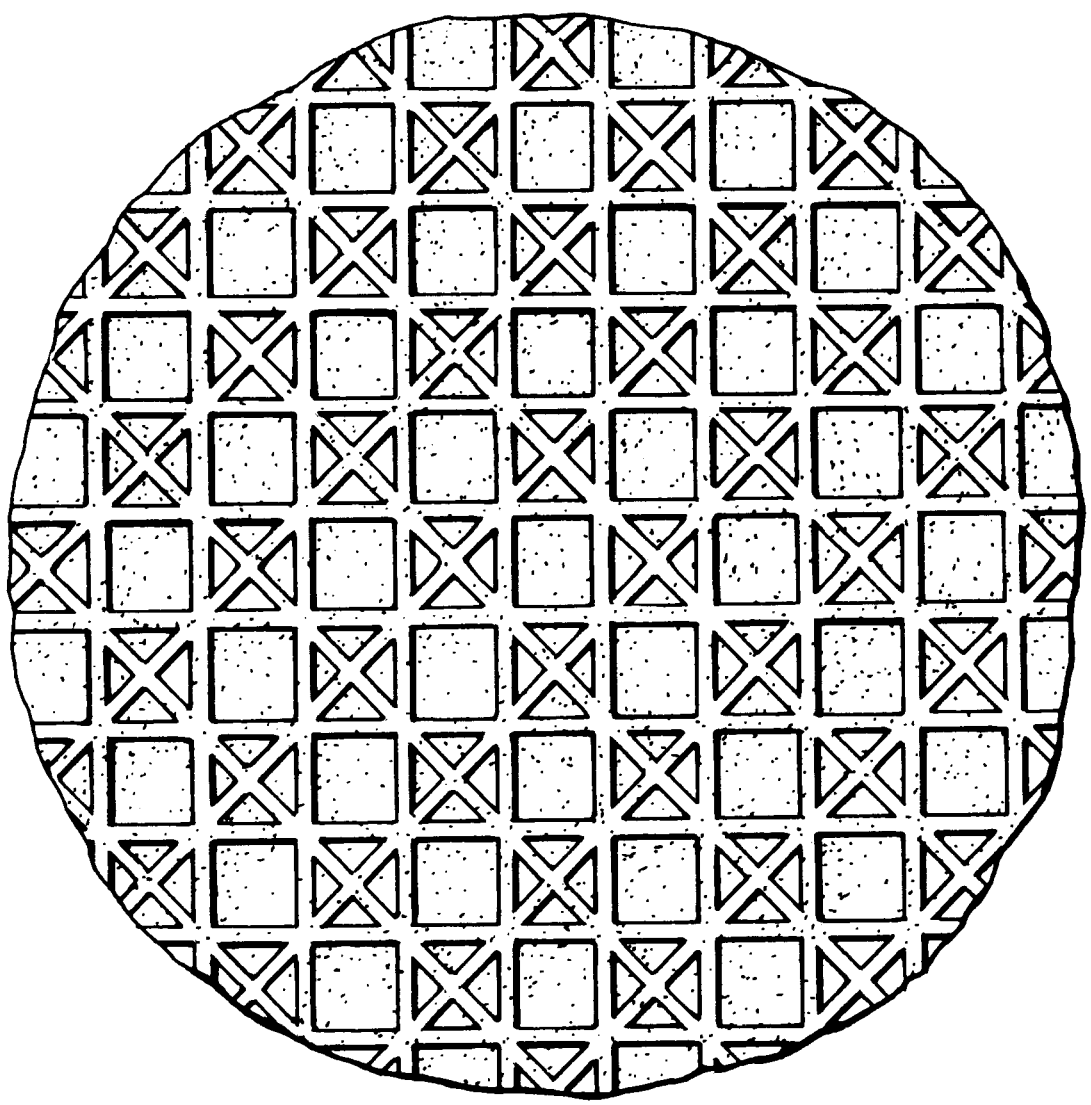
FIG. 5 shows an alternative first surface pattern according to the invention.
Figure 6B:
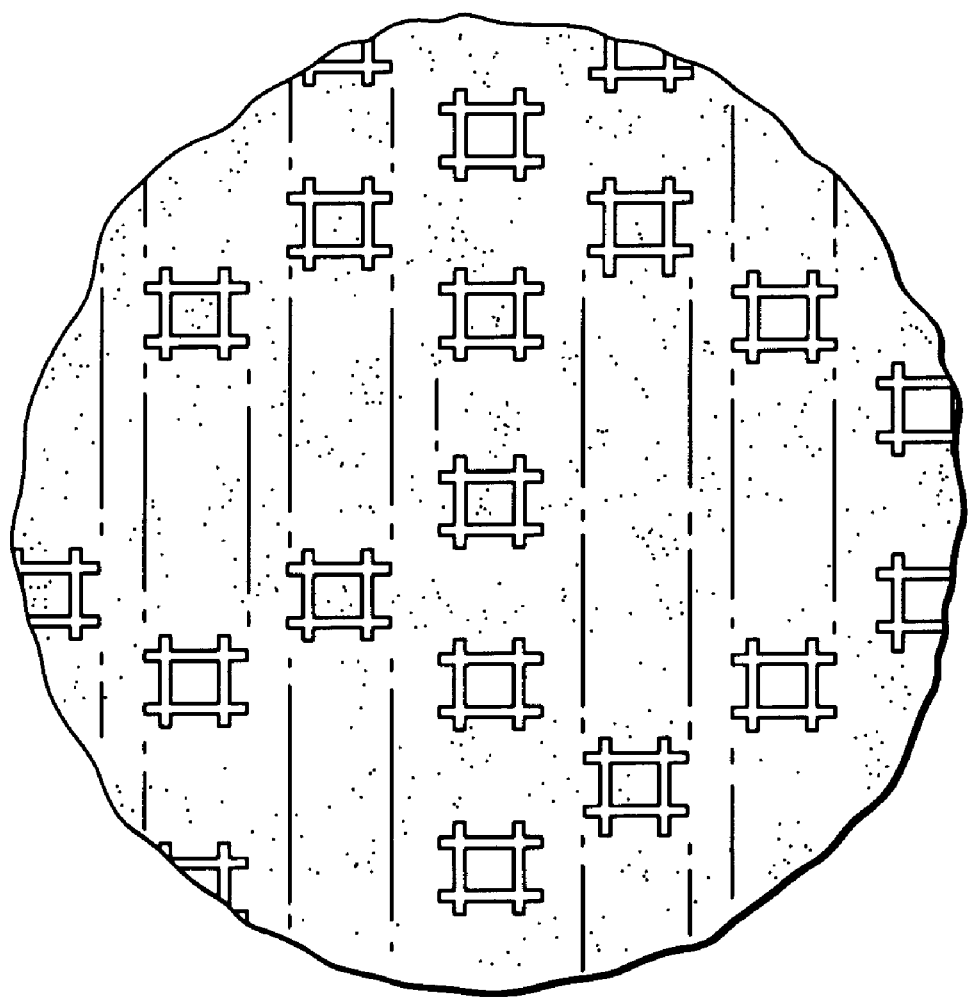

Example 1 was repeated except the heated flat plates used were engraved such that the wafer was provided with a first surface having a pattern as shown in FIG. 5 and a second surface having a pattern as shown in FIG. 2, the pattern in FIG. 2 being at 45° to the smaller square grid of the pattern shown in FIG. 5.

An approximately circular, crisp wafer was provided.

Comparative Example A

Example 1 was repeated except that the heated flat plate was engraved such that the wafer was provided with a single surface having a pattern as shown in Figure A.

A wafer having the shape as shown in Figure A was produced. This shape is not sufficiently circular.

Comparative Example B

Example 1 was repeated except that the heated flat plate was engraved such that the wafer was provided with a single surface having a pattern as shown in Figure B.

A wafer having the shape as shown in Figure B was produced. This shape is not sufficiently circular.

We claim:

1. A crisp, approximately circular wafer product whereby the two surfaces of the wafer each have a pattern formed by ridges, the first surface having a pattern comprising at least two raised grid patterns superimposed on each other, one of said at least two grid patterns being at an angle of approximately 45° to the other, the second surface having a single raised grid pattern, the single grid pattern being at 45° to at least one of the grid patterns on the first surface.

2. A wafer product according to claim 1 wherein each of said grid patterns is formed by a pattern of squares.

3. A wafer according to claim 2 wherein the first grid pattern of the first surface is of squares larger compared to the squares forming the second grid pattern of said first surface.

4. A wafer product according to claim 2 wherein the squares forming the grid pattern on the second surface are smaller compared with the squares forming the first grid pattern on the first surface.

5. A wafer product according to claim 2 wherein the squares forming the grid pattern on the second surface are smaller compared with the squares forming either of the first and second grid patterns on the first surface.

6. A wafer according to claim 2 wherein the grid pattern of the second surface has the same orientation as the first grid pattern of the first surface.

* * * * *